A. M. GOW.
LOCKING MECHANISM FOR DUMP CARS.
APPLICATION FILED SEPT. 12, 1918.

1,294,088.

Patented Feb. 11, 1919.

Witnesses:
A. J. Sauser
Chas. L. Byron

Inventor:
Alexander M. Gow,
By D. Anthony Usina
Atty.

UNITED STATES PATENT OFFICE.

ALEXANDER M. GOW, OF DULUTH, MINNESOTA.

LOCKING MECHANISM FOR DUMP-CARS.

1,294,088. Specification of Letters Patent. Patented Feb. 11, 1919.

Application filed September 12, 1918. Serial No. 253,775.

*To all whom it may concern:*

Be it known that I, ALEXANDER M. GOW, a citizen of the United States, residing at Duluth, in the county of St. Louis and State of Minnesota, have invented certain new and useful Improvements in Locking Mechanism for Dump-Cars, of which the following is a specification.

This invention relates to dump cars, and more particularly to locking mechanism therefor.

One of the objects of this invention is to simplify the construction and operation of locking mechanism for dump cars.

Another object is to provide a dump car locking mechanism which may be operated with a minimum amount of power and which is adapted to meet the various requirements for successful commercial operation.

These and other objects are accomplished by means of the arrangement disclosed by the accompanying sheet of drawings, in which—

Figure 1:
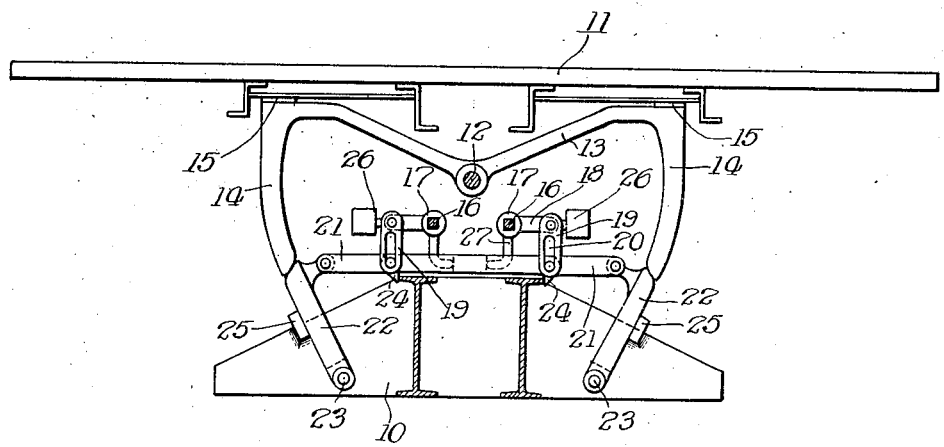
Figure 2:
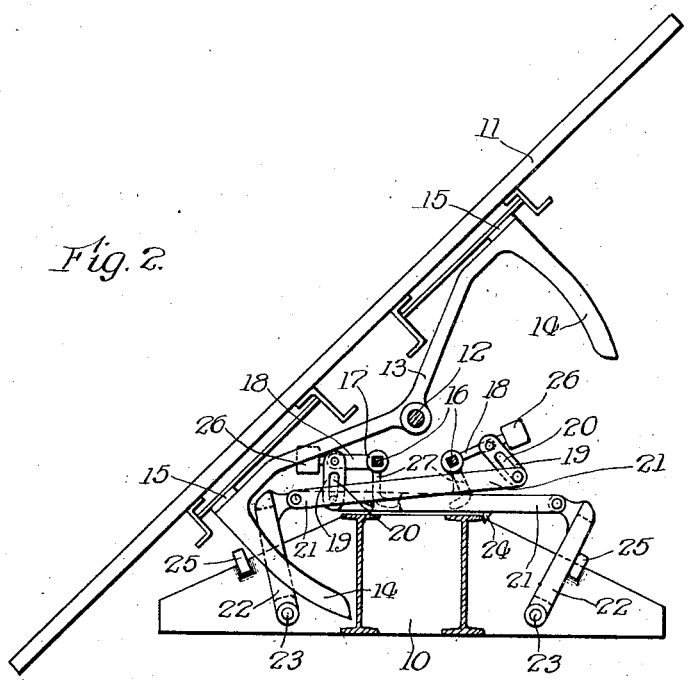

Figure 1 is a fragmentary transverse sectional view of a dump car embodying my locking mechanism, the parts being in their normal locking position; and, Fig. 2 is a similar transverse sectional view showing the car body in a dumped position with locking parts arranged accordingly.

The various novel features of my invention will be apparent from the following description and drawings and will be particularly pointed out in the appended claims.

This dump car includes a car frame 10 upon which is pivotally mounted a car body 11, whereby the latter may be tilted to one side or the other for dumping purposes. Also pivotally mounted on the car frame and concentrically with respect to the car body at 12 is a member 13 having preferably formed integrally therewith two horn members 14 arranged on opposite sides of the longitudinal center of the car, and extending downwardly with respect to the car body. The upper ends of these horns 14 are provided with bearing portions 15 upon which the under part of the car body rests. If desired, the horns 14 may be formed integrally with the car body, but preferably they are arranged as shown, so that the car body may be adjusted if necessary to compensate for any irregularities in the manufacture of the car body in order that the latter normally may be maintained in a central balanced condition. With the arrangement shown, shims may be inserted between the bearing portions 15 and the bottom portion of the car body for balancing the latter.

The locking mechanism includes two longitudinally arranged shafts 16 located on opposite sides of the longitudinal center of the car and carried by the car frame 10. Connected to each of the shafts 16 is a bell crank member 17, to one arm 18 of which is pivotally connected a link 19 having an elongated slot 20, the link in each case being pivotally connected to a laterally extending strut 21 pivotally connected to a member 22, the latter of which in turn is pivotally connected at 23 to the frame 10. Each of the struts 21 is provided with a projection 24 which normally engages a suitable part of the frame 10 to resist lateral movement of the strut 21 and member 22 to prevent a tilting action of the car body 11. The member 22 in each case is limited in its outward lateral pivotal movement by a stop member 25 carried by the car frame 10.

It will be noted that when the parts are arranged in normal positions, as shown in Fig. 1 of the drawings, the lower ends of the horn members 14 rest upon and engage the upper ends of the members 22. It will be noted also that the engaging faces of the members 14 and 22 are engaged at an angle tending to thrust the members 22 and 21 laterally inwardly. This movement, however, normally is resisted by the locking projections 24 on the members 21. When either of the struts 21 is raised to an extent whereby the locking projection 24 clears the coöperating portion of the frame by a rotation of the corresponding locking shaft 16, the weight of the car body during a dumping action to one side or the other will be sufficient to cause an inwardly lateral movement of the strut 21 and the corresponding supporting member 22, whereupon the car body will be free to dump in the desired direction. The strut member 21 and the member 22 are under compression when the horn 14 presses downwardly upon the member 22. When the horn 22 moves the corresponding member 22 laterally inwardly, it does so by a camming action as a result of the angularity of the engaging faces, and it will be noted that this camming action requires a minimum amount of power. By means of this arrangement the locking shaft does not positively draw the members 21 and 22 away from the horn 14 against the weight of the car body and of the load, but, on the other hand, the strut member 21 is merely released by operation of the locking shaft, and the strut 21 and its coöperating member 22 are forced laterally out of a supporting position by the weight of the car body, or the load, or both.

Preferably, the car body is dumped by means of the operation shown in my copending application, Serial No. 253,744, filed Sept. 12, 1918, it being understood that the locking mechanism is first actuated before there is a real dumping action of the car body. Mounted upon each of the locking shafts 16 is a weighted member 26 which returns the shaft and, therefore, the bell crank 17, to its normal position whereby the other arm 27 of the bell crank engages a shoulder on the corresponding strut 21 to force it laterally outwardly, together with the member 22, to a point where the locking shoulder 24 may fall into locking engagement with the associated part of the car frame, in which position the parts are shown in Fig. 1. The location of the pivot point 23 is such that gravity assists the return of the member 22 to a supporting position, but for mechanical and structural reasons it is desirable that the point 23 be moved out as far as possible so that the arm 22 has but slight tendency to fall outwardly by gravity. In fact, the point 23 might be placed so far out that arm 22 would stand vertically in the supporting position, in which case gravity would not assist and I would wholly depend on the action of the arm 27 to return it to a vertical position.

When I refer to the engaging surfaces of the members 14 and 22, I mean surfaces or faces which abut at an angle to the line of pressure.

This locking arrangement requires a minimum amount of power for operation of the same, and at the same time it provides a simple and efficient arrangement adapted to meet the various requirements for successful commercial operation.

It is my intention to cover all modifications of my invention falling within the spirit and scope of the following claims.

I claim:

1. In a dump car, the combination of a tiltable car body, a member movable therewith, a normally locked supporting member associated with the first mentioned member for preventing the car body from dumping, means whereby when the supporting member is released it will be moved by the weight of the car body to permit a dumping action of the latter, and means independent of the car body for returning the supporting member.

2. In a dump car, the combination of a tiltable car body, operating members associated with the car body normally for preventing tilting thereof, said members having interengageable portions whereby one member will be moved from a supporting position through the action of the other by the weight of the car body under predetermined conditions to permit dumping of the car body, and means independent of the car body for returning said member to a supporting position.

3. In a dump car, the combination of a car frame, a car body tiltably mounted thereon, a member movable with the car body, a supporting member connected to the car frame and having a portion normally engaging the first mentioned member for preventing tilting of the car body, there being a camming action between said members under certain predetermined conditions for permitting the car body to be dumped, and means independent of the car body for returning the supporting member to a supporting position.

4. In a dump car, the combination of a car frame, a car body mounted thereon for tilting, a horn member movable with the car body, a supporting member normally engaging the horn, means normally for preventing movement of said supporting member, means for releasing said supporting member, said horn and supporting member having interengaging portions whereby upon the release of the supporting member the latter will be moved from a supporting position to permit dumping of the car body, and means independent of the car body for returning the supporting member to supporting position.

5. In a dump car, the combination of a car frame, a car body mounted thereon for tilting, a horn member movable with the car body, a supporting member normally engaging the horn, means normally for preventing movement of said supporting member, means for releasing said supporting member, said horn and supporting member having interengaging portions whereby upon the release of the supporting member the latter will be moved from a supporting position to permit dumping of the car body, and independent means for restoring the supporting member to a supporting position.

6. In a dump car, the combination of a car body mounted for a tilting movement, a horn member movable with the car body and having a cam surface at one end, a supporting member, a portion of the supporting member having a cam surface engaging the cam surface on the horn member whereby under certain conditions the supporting member is moved from a supporting position due to the camming action between the supporting member and horn for permitting the car body to be dumped.

7. In a dump car, the combination of a car frame, a car body pivotally mounted thereon, a horn member movable with the car body, a supporting member pivotally mounted on said car frame and normally engaging the horn to prevent dumping action of the car body, means for locking the supporting member in a supporting position, and means for releasing the supporting member from supporting position, the horn member and supporting member having interengaging cam surfaces whereby upon the release of the supporting member the latter will be moved from a supporting position to permit dumping of the car body.

8. In a dump car, the combination of a car frame, a car body pivotally mounted thereon, a horn member movable with the car body, a supporting member pivotally mounted on said car frame and normally engaging the horn to prevent dumping action of the car body, means for locking the supporting member in a supporting position, means for releasing the supporting member from supporting position, the horn and supporting members having interengaging cam surfaces whereby upon release of the supporting member the latter will be moved from a supporting position to permit dumping of the car body, and means for restoring the supporting member to a supporting position under certain conditions.

Signed at Duluth, Minn., this 4th day of September, 1918.

ALEXANDER M. GOW.

Witnesses:
   JOHN E. CARLSON,
   E. H. WINDOM.